(12) United States Patent
Kanda (10) Patent No.: US 9,993,902 B2
(45) Date of Patent: Jun. 12, 2018

(54) MACHINE TOOL

(71) Applicant: KOMATSU NTC LTD., Nanto (JP)

(72) Inventor: Akira Kanda, Nanto (JP)

(73) Assignee: KOMATSU NTC LTD., Nanto (JP)

(*) Notice: Subject to any disclaimer, the term of this patent is extended or adjusted under 35 U.S.C. 154(b) by 324 days.

(21) Appl. No.: 14/910,842

(22) PCT Filed: Jun. 10, 2014

(86) PCT No.: PCT/JP2014/065334
§ 371 (c)(1),
(2) Date: Feb. 8, 2016

(87) PCT Pub. No.: WO2015/029540
PCT Pub. Date: Mar. 5, 2015

(65) Prior Publication Data
US 2016/0193706 A1    Jul. 7, 2016

(30) Foreign Application Priority Data

Aug. 29, 2013  (JP) .................................. 2013-178077

(51) Int. Cl.
*B23Q 3/157*   (2006.01)
*B23Q 11/08*   (2006.01)
*B23Q 3/155*   (2006.01)

(52) U.S. Cl.
CPC ........ *B23Q 3/1554* (2013.01); *B23Q 11/0891* (2013.01); *B23Q 3/15766* (2013.01); *B23Q 2003/155418* (2016.11); *B23Q 2003/155428* (2016.11); *B23Q 2003/155439* (2016.11); *Y10T 483/115* (2015.01)

(58) Field of Classification Search
CPC . Y10T 483/115; B23Q 11/08–11/0891; B23Q 3/155–3/15793
USPC ............................................................ 483/3
See application file for complete search history.

(56) References Cited

U.S. PATENT DOCUMENTS 3,930,302 A * 1/1976 Ochiai ............... B23Q 3/15526
483/3
5,224,916 A * 7/1993 Chang .................... B23Q 11/08
483/3

(Continued)

FOREIGN PATENT DOCUMENTS

CN        1939662 A      4/2007
CN     202162599 U      3/2012

(Continued)

OTHER PUBLICATIONS

Machine Translation of JP 07-060596 A, which JP '596 was published Mar. 7, 1995.*

(Continued)

*Primary Examiner* — Erica E Cadugan
(74) *Attorney, Agent, or Firm* — Cantor Colburn LLP (57) ABSTRACT

A machine tool includes a door used for opening and closing an opening of a frame and a tool exchanger arm used for exchanging a tool between a tool magazine and a main shaft. The machine tool further includes an interlocking mechanism provided between the door and the tool exchanger arm. The interlocking mechanism works in an interlocking relationship with tool exchanging operation by the tool exchanger arm to open and close the door.

6 Claims, 6 Drawing Sheets (56) References Cited

U.S. PATENT DOCUMENTS

| | | | | |
|---|---|---|---|---|
| 5,649,887 | A | * | 7/1997 | Taki ............... B23Q 3/1576 483/3 |
| 5,704,884 | A | * | 1/1998 | Uemura ........... B23Q 3/1554 483/3 |
| 7,229,395 | B2 | * | 6/2007 | Yoshida ........... B23Q 11/0891 483/3 |
| 2003/0050159 | A1 | * | 3/2003 | Kato ............... B23Q 3/1554 483/3 |
| 2013/0203572 | A1 | * | 8/2013 | Denkmeier ........ B21D 5/0254 483/58 |

FOREIGN PATENT DOCUMENTS

| | | | |
|---|---|---|---|
| CN | 102463498 A | | 5/2012 |
| CN | 102476316 A | | 5/2012 |
| CN | 203092215 U | | 7/2013 |
| DE | 10224576 A1 | * | 12/2003 |
| JP | 253331 U | | 4/1990 |
| JP | 4129636 A | | 4/1992 |
| JP | 05-169338 A | * | 7/1993 |
| JP | 0760596 A | | 3/1995 |
| JP | 08-066836 A | * | 3/1996 |
| JP | 2002-103175 A | * | 4/2002 |
| JP | 2004098212 A | | 4/2004 |
| JP | 2007-175819 A | * | 7/2007 |
| JP | 2012148382 A | | 8/2012 |

OTHER PUBLICATIONS

Chinese Office Action (no English translation) dated Dec. 2, 2016; during prosecution of the corresponding Chinese patent application No. 201480045559.4.

International Preliminary Search Report on Patentability; International Application No. PCT/JP2014/065334; International Filing Date Jun. 10, 2014; dated Mar. 1, 2016, 6 pages.

International Search Report dated Aug. 19, 2014 in related PCT/JP2014/065334.

Office Action dated May 30, 2017 during prosecution of the corresponding Japanese patent application No. 2013-178077.

* cited by examiner

MACHINE TOOL

FIELD OF THE INVENTION

This invention relates to a machine tool with a tool exchanger arm used for exchanging a tool attached to a main shaft.

BACKGROUND OF THE INVENTION

A machine tool of this type is disclosed in patent documents 1 and 2, for example. In each of these conventional structures, a driving unit exchanges a tool by using the tool exchanger arm, and opens and closes a shutter attached to an opening of a device. To achieve this structure, the device disclosed in patent document 1 includes a cam mechanism and a link mechanism to form a power transmission mechanism between the shutter and the driving unit. Further, the device disclosed in patent document 2 includes multiple cams, gears, etc. to form a power transmission mechanism between a driving shaft used for operating the tool exchanger arm and a door.

Each of the devices disclosed in the patent documents includes the power transmission mechanism provided between the driving unit and the door in addition to another power transmission mechanism provided between the driving unit and the tool exchanger arm. Specifically, each of these devices includes power transmission mechanisms of two systems, complicating the structure of the device.

PRIOR ART DOCUMENTS

Patent Documents

Patent Document 1: Japanese Laid-Open Patent Publication No. 7-60596
Patent Document 2: Japanese Laid-Open Patent Publication No. 2004-98212

SUMMARY OF THE INVENTION

An object of the present invention is to provide a machine tool of a simplified structure.

To solve the aforementioned problem, the first aspect of this invention provides a machine tool including a processing room for processing, a tool room where a tool exchanger arm is placed, a partition wall with which the processing room and the tool room are defined, and a door used for opening and closing an opening formed in the partition wall. An interlocking mechanism is provided between the door and the tool exchanger arm. The interlocking mechanism works in an interlocking relationship with tool exchanging operation by the tool exchanger arm to open and close the door.

In this structure, during the tool exchanging operation by the tool exchanger arm, the interlocking mechanism works in an interlocking relationship with the tool exchanging operation by the tool exchanger arm to open and close the door. This eliminates the need for providing a power transmission mechanism between a driving unit and the door independently of the tool exchanger arm. As a result, the structure of the machine tool is simplified.

DETAILED DESCRIPTION OF THE PREFERRED EMBODIMENTS

An embodiment of a machine tool of this invention is described below by referring to FIGS. 1 to 7.

Figure 1:
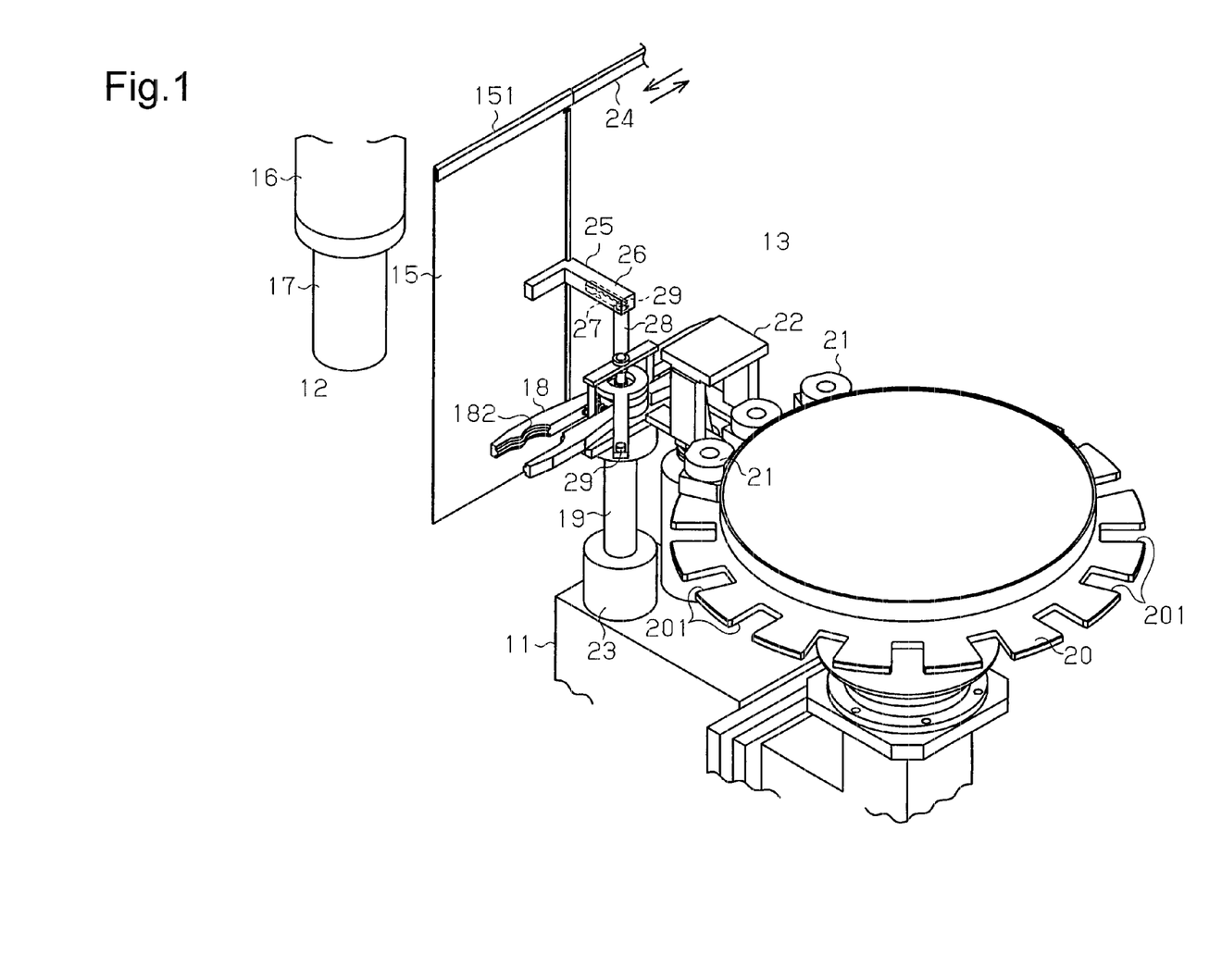
FIG. 1 is a partial perspective view showing a machine tool of an embodiment of this invention.
Figure 2:
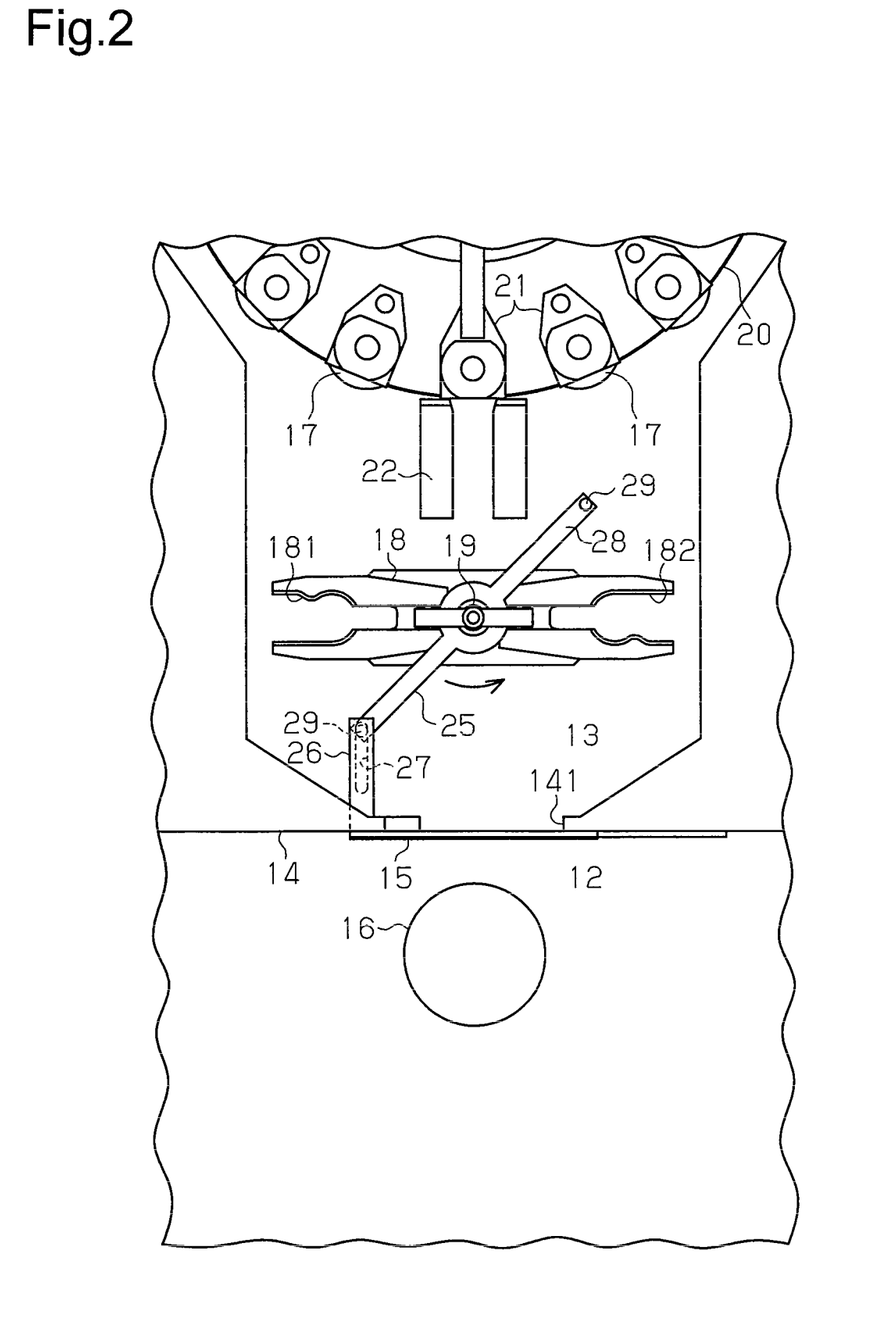
FIG. 2 is a partial plan view of the machine tool.

As shown in FIGS. 1 and 2, the machine tool includes a frame 11 having a partition wall 14 with which a processing room 12 and a tool room 13 are defined. An opening 141 is formed in a part of the partition wall 14. A door 15 used for opening and closing the opening 141 is attached to the partition wall 14 in a manner such that the door 15 can move laterally. The door 15 is suspended from a rail 24 via a guidance part 151 at the upper end of the door 15.

As shown by the directions of arrows of FIG. 1, in response to sliding movement of the guidance part 151 along the rail 24, the door 15 moves laterally to open and close the opening 141. A main shaft 16 is located in the processing room 12. The main shaft 16 can move biaxially in a direction from front to back and a direction from left to right. The main shaft 16 can move toward the tool room 13. The main shaft 16 has a lower end to which a tool 17 used for processing work not shown in the drawings is attached. The tool 17 can be attached to and detached from the main shaft 16. The work is placed on a table not shown in the drawings that can move vertically.

As shown in FIGS. 1 and 2, a tool exchanger arm 18 is placed near the opening 141 of the partition wall 14 in the tool room 13. The tool exchanger arm 18 is attached to a rotary shaft 19 extending vertically. A driving mechanism 23 can make the tool exchanger arm 18 rotate together with the rotary shaft 19 and move in an axis direction of the rotary shaft 19. The tool exchanger arm 18 has a grasping part 181 and a grasping part 182 used for grasping the tool 17. A tool magazine 20 is located behind the tool exchanger arm 18 in the tool room 13. The tool magazine 20 has a disk like shape. The tool magazine 20 can rotate about an axis line parallel to the rotary shaft 19. The tool magazine 20 has an outer periphery provided with multiple support recesses 201 spaced apart at regular angular intervals. A tool pot 21 is attached to each of the multiple support recesses 201. The tool pot 21 can be attached to and detached from the support recess 201. The tool magazine 20 is rotated by a motor not shown in the drawings. Tools 17 of different types, sizes, etc. are supported by the tool pots 21. The tool 17 can be attached to and detached from the tool pot 21.

Figure 3:
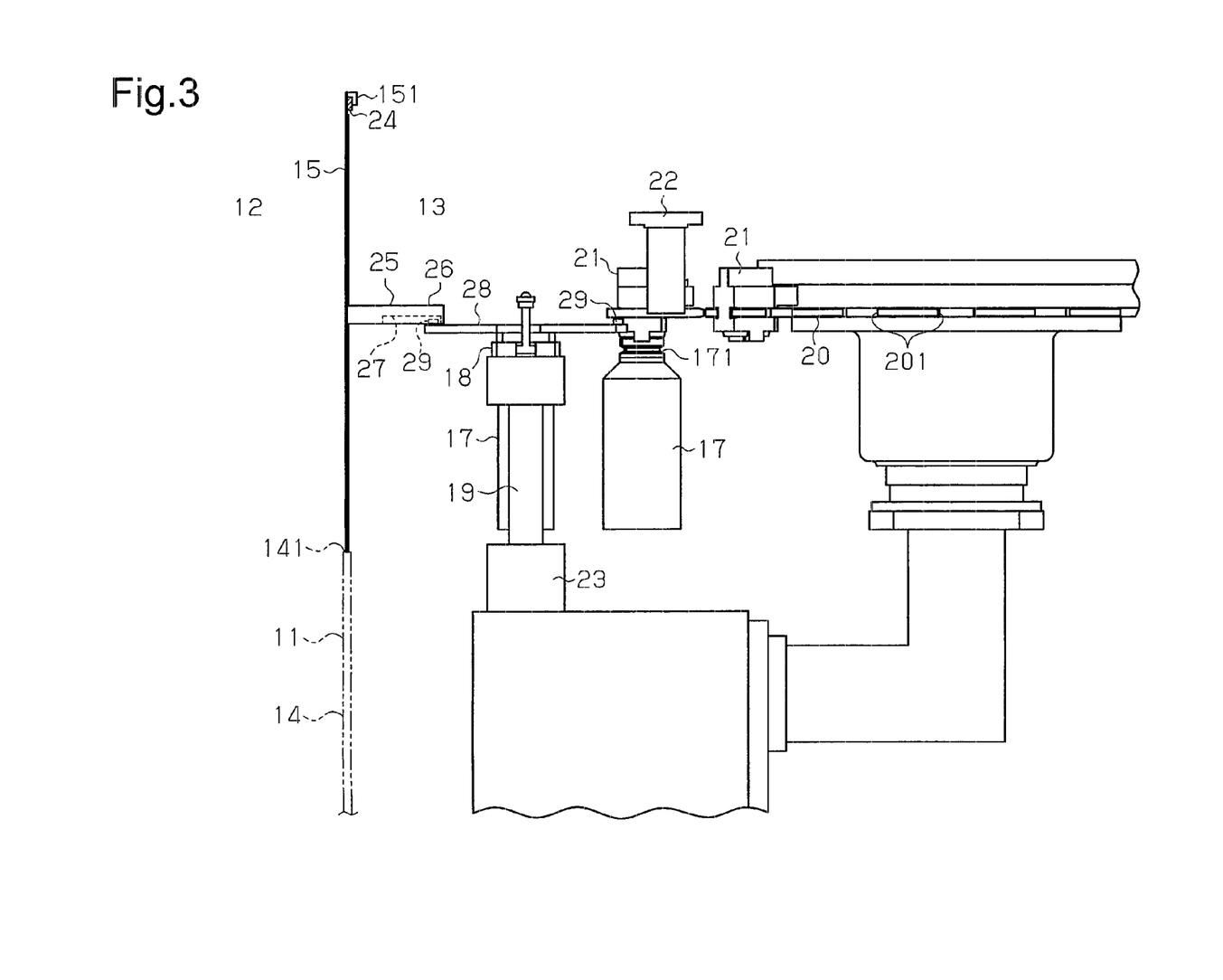
FIG. 3 is a partial side view of the machine tool.

As shown in FIGS. 1 to 3, a receiving table 22 is placed between the tool exchanger arm 18 and the tool magazine 20 in the tool room 13. The receiving table 22 is used for receiving the tool pot 21 to which the tool 17 is attached from the support recess 201 of the tool magazine 20 or transferring the tool pot 21 with the tool 17 to the support recess 201. An interlocking mechanism 25 is placed between the door 15 and the tool exchanger arm 18. The interlocking mechanism 25 works in an interlocking relationship with tool exchanging operation by the tool exchanger arm 18 to open and close the door 15.

The interlocking mechanism 25 has a receiving part 26 to protrude into the tool room 13 through the door 15. The receiving part 26 has a lower surface provided with a long hole 27. The long hole 27 extends in a direction crossing a direction where the door 15 moves. The interlocking mechanism 25 further has a lever 28. The lever 28 is fixed to the upper end of the rotary shaft 19. This rotates the lever 28 together with the tool exchanger arm 18 and moves the lever 28 in the axis direction.

The lever 28 is tilted horizontally from a direction where the tool exchanger arm 18 extends. The lever 28 has pins 29 in a pair to be fitted in the long hole 27 of the receiving part 26 that are provided at opposite ends of the upper surface of the lever 28. As the tool exchanger arm 18 moves down, the pin 29 is removed from the long hole 27. During the tool exchanging operation by the tool exchanger arm 18, the pin 29 is fitted in the long hole 27 to open and close the door 15.

The action of the aforementioned machine tool is described below by referring to FIGS. 1 to 7.

FIGS. 1 and 2 show a state where the main shaft 16 is located in the processing room 12 and the tool 17 is attached to the lower end of the main shaft 16. In this state, the tool exchanger arm 18 is located at a non-exchange position that is a position parallel to the direction where the door 15 moves. Further, one of the pins 29 of the lever 28 is fitted in the long hole 27 of the receiving part 26. As a result of these, the door 15 is located at a position where the opening 141 of the partition wall 14 is closed. If the main shaft 16 rotates in this state, work is processed with the tool 17. At this time, the opening 141 of the partition wall 14 is closed by the door 15. This prevents entry of a scrap resulting from the processing, a coolant, etc. from the processing room 12 into the tool room 13 through the opening 141. During processing on the work, the tool magazine 20 rotates to make preparation for subsequent processing. Specifically, a tool 17 to be used for the subsequent processing out of multiple tools supported in the support recesses 201 is placed at a position corresponding to the receiving table 22.

Figure 4:
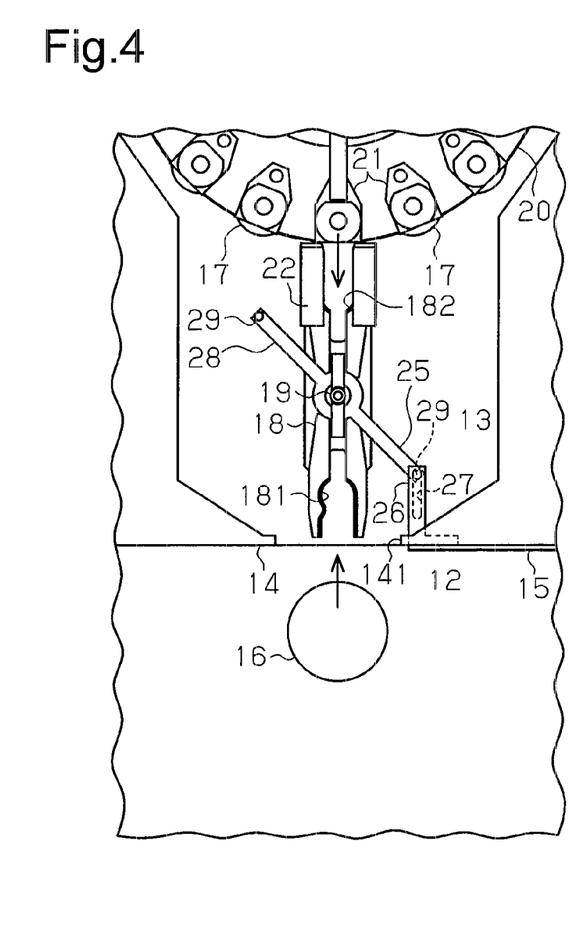
FIG. 4 is a partial plan view showing tool exchanging operation by the machine tool.

If exchange of the tool 17 becomes necessary after the processing on the work is finished, the tool exchanger arm 18 moves to a position shown in FIG. 4. Specifically, the tool exchanger arm 18 rotates 90 degrees anticlockwise from the position of FIG. 2 to be placed at an exchange position that is a position crossing the direction where the door 15 moves. At this time, the lever 28 rotates together with the rotation of the tool exchanger arm 18. The lever 28 rotates in the same direction as the rotational direction of the tool exchanger arm 18. Further, the pin 29 is fitted in the long hole 27 at this time. This makes the lever 28 move the door 15 to a position where the opening 141 of the partition wall 14 is opened.

Figure 5:
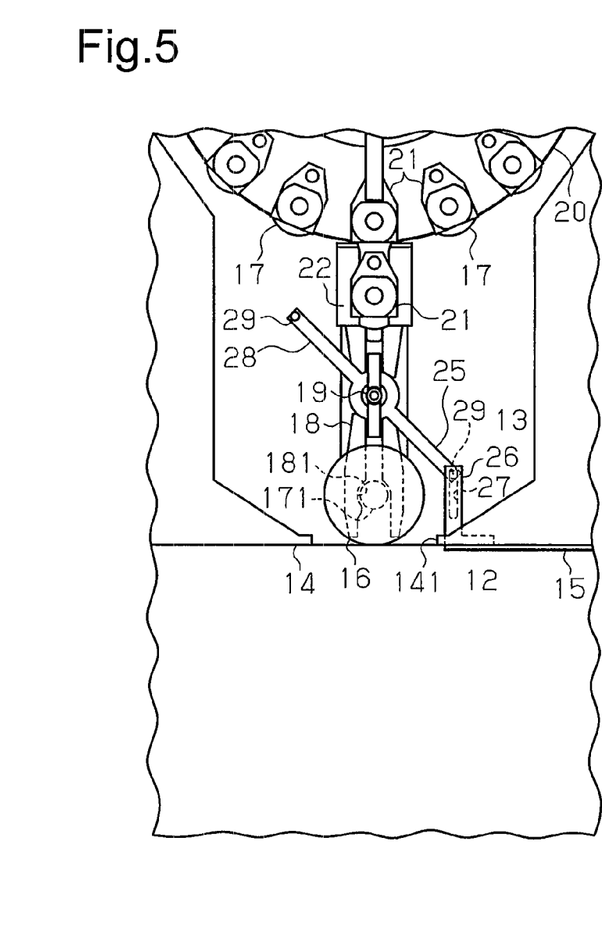
FIG. 5 is a partial plan view showing the tool exchanging operation.

As shown in FIG. 5, the main shaft 16 thereafter moves from the processing room 12 into the tool room 13 through the opening 141 of the partition wall 14. At this time, a groove 171 of the tool 17 (FIG. 3) attached to the main shaft 16 is grasped with one grasping part 181 of the tool exchanger arm 18. At the same time, the tool 17 placed at the position corresponding to the receiving table 22 and the tool pot 21 are transferred together from the support recess 201 of the tool magazine 20 onto the receiving table 22 by a transferring mechanism of the tool magazine 20 not shown in the drawings. At this time, the groove 171 of the tool 17 attached to the tool pot 21 is grasped with the other grasping part 182 of the tool exchanger arm 18. In this state, the tool exchanger arm 18 moves down. This extracts the used tool 17 from the main shaft 16 and the unused tool 17 from the tool pot 21. At the same time, the pin 29 of the interlocking mechanism 25 is removed from the long hole 27.

Next, the tool exchanger arm 18 rotates 180 degrees anticlockwise from the position of FIG. 5. This locates the used tool 17 fitted to one grasping part 181 below the tool pot 21 on the receiving table 22. This further locates the unused tool 17 fitted to the other grasping part 182 below the main shaft 16. In this state, the tool exchanger arm 18 moves up. As a result, the used tool 17 is attached to the tool pot 21 from below and the new tool 17 is attached to the main shaft 16 from below. At the same time, the pin 29 different from the pin 29 removed from the long hole 27 in the state of FIG. 5 is fitted in the long hole 27 of the receiving part 26.

Figure 6:
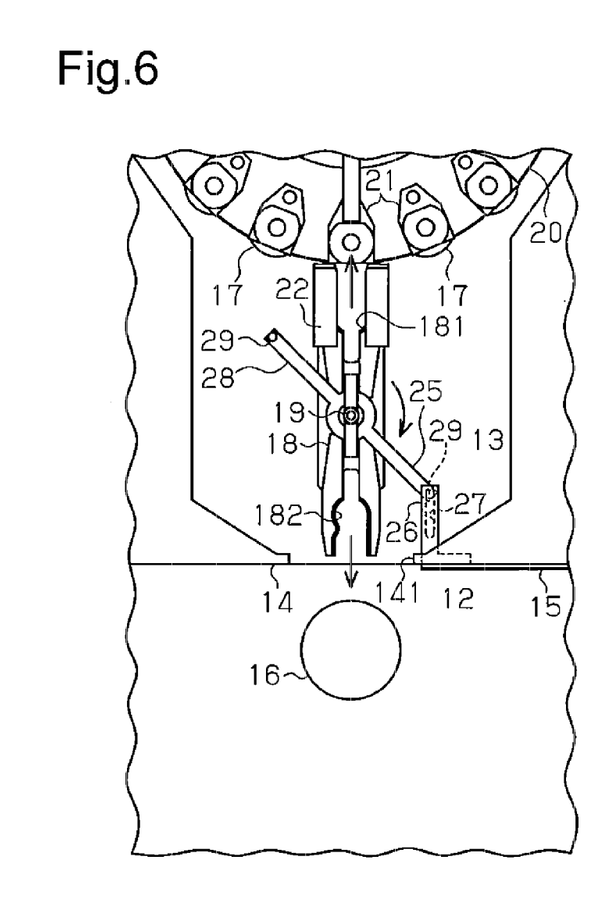
FIG. 6 is a partial plan view showing the tool exchanging operation.
Figure 7:
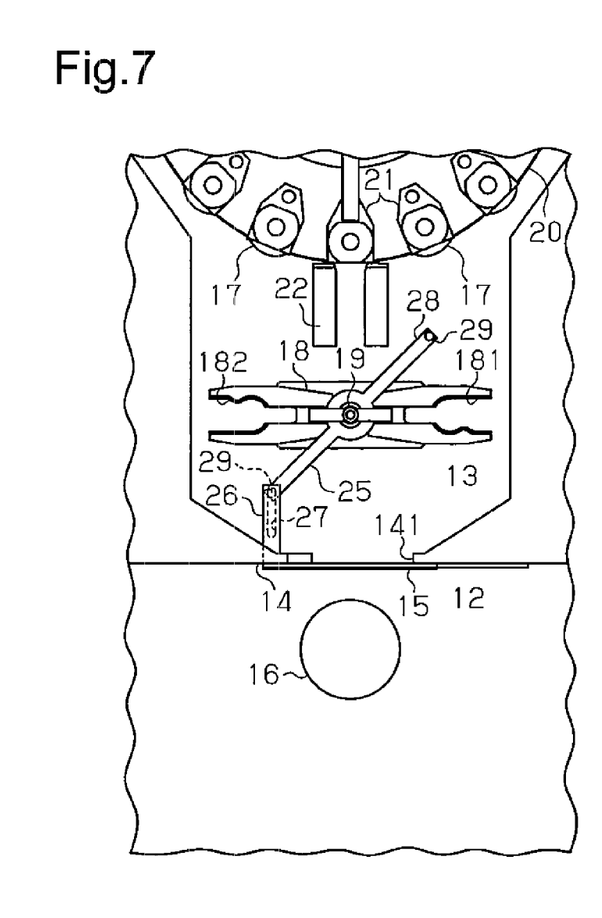
FIG. 7 is a partial plan view showing the tool exchanging operation.

Next, as shown in FIG. 6, the main shaft 16 moves from the tool room 13 into the processing room 12 through the opening 141 of the partition wall 14. Further, the used tool 17 and the tool pot 21 are transferred together from the receiving table 22 into the support recess 201 of the tool magazine 20 by the transferring mechanism. Then, the tool exchanger arm 18 moves to the position shown in FIG. 7. Specifically, the tool exchanger arm 18 rotates 90 degrees clockwise from the position of FIG. 6 to be placed at the non-exchange position that is a position parallel to the direction where the door 15 moves. At this time, the lever 28 rotates together with the rotation of the tool exchanger arm 18. The lever 28 rotates in the same direction as the rotational direction of the tool exchanger arm 18. Further, the pin 29 is fitted in the long hole 27 at this time. This moves the door 15 to a position where the opening 141 of the partition wall 14 is closed. Then, the processing on the work is restarted with the tool 17 thereby attached to the main shaft 16.

This embodiment achieves the following effects.

(1) The interlocking mechanism 25 is located between the door 15 and the tool exchanger arm 18. The interlocking mechanism 25 works in an interlocking relationship with the tool exchanging operation by the tool exchanger arm 18 to open and close the door 15. In this structure, if a tool is to be exchanged using the tool exchanger arm 18, the door 15 is opened and closed in response to power applied directly from the tool exchanger arm 18. This eliminates the need for providing a structure for opening and closing the door 15 in addition to a structure for applying power to the tool exchanger arm 18. Thus, the structure of the machine tool is simplified.

(2) The interlocking mechanism 25 is only formed of the lever 28 with the pins 29 and the receiving part 26 with the long hole 27. Specifically, the interlocking mechanism 25 is formed of a small number of components. This makes the structure of the interlocking mechanism 25 extremely simple.

(3) Compared to the power transmission mechanism described in patent document 1, the simple structure of the interlocking mechanism 25 shortens a power transmission path and reduces a clearance existing between the components. This reduces loss of time caused by the clearance between the components during exchange of a tool and achieves smooth exchange of the tool.

(4) The interlocking mechanism 25 includes the receiving part 26 fixed to the door 15 and the pin 29 that rotates together with the tool exchanger arm 18. The pin 29 is fitted in the long hole 27 of the receiving part 26 and removed from the long hole 27 in response to movement of the tool exchanger arm 18 in the axis direction. In this structure, the long hole 27 and the pin 29 are fitted to each other to open and close the door 15 properly in an interlocking relationship with the tool exchanging operation by the tool exchanger arm 18. More specifically, the tool exchanger arm 18 rotates first to open the door 15. Next, the tool exchanger arm 18 moves down to release coupling between the door 15 and the tool exchanger arm 18, extract a used tool 17 from the main shaft 16, and extract an unused tool 17 from the tool pot 21. Then, the tool exchanger arm 18 rotates. In this way, the used tool 17 and the unused tool 17 are exchanged. Next, the tool exchanger arm 18 moves up to attach the used tool 17 to the tool pot 21 and the unused tool 17 to the main shaft 16. Further, the upward movement of the tool exchanger arm 18 couples the tool exchanger arm 18 and the door 15. Thus, as the tool exchanger arm 18 rotates, the door 15 is closed. In this way, the door 15 is opened, a tool is exchanged, and the door 15 is closed continuously only by the rotation and the upward and downward movements of the tool exchanger arm 18.

(5) The frame 11 has the partition wall 14 with which the processing room 12 and the tool room 13 are defined. The opening 141 is formed in the partition wall 14. The tool exchanger arm 18 is placed near the opening 141 of the partition wall 14 in the tool room 13. In this structure, the door 15 can be opened and closed in an interlocking relationship with the tool exchanging operation by the tool exchanger arm 18. This allows the tool 17 to move between the processing room 12 and the tool room 13. Further, entry of a coolant from the processing room 12 into the tool room 13 can be prevented during processing on a work.

This embodiment can be changed as follows.

Figure 8:
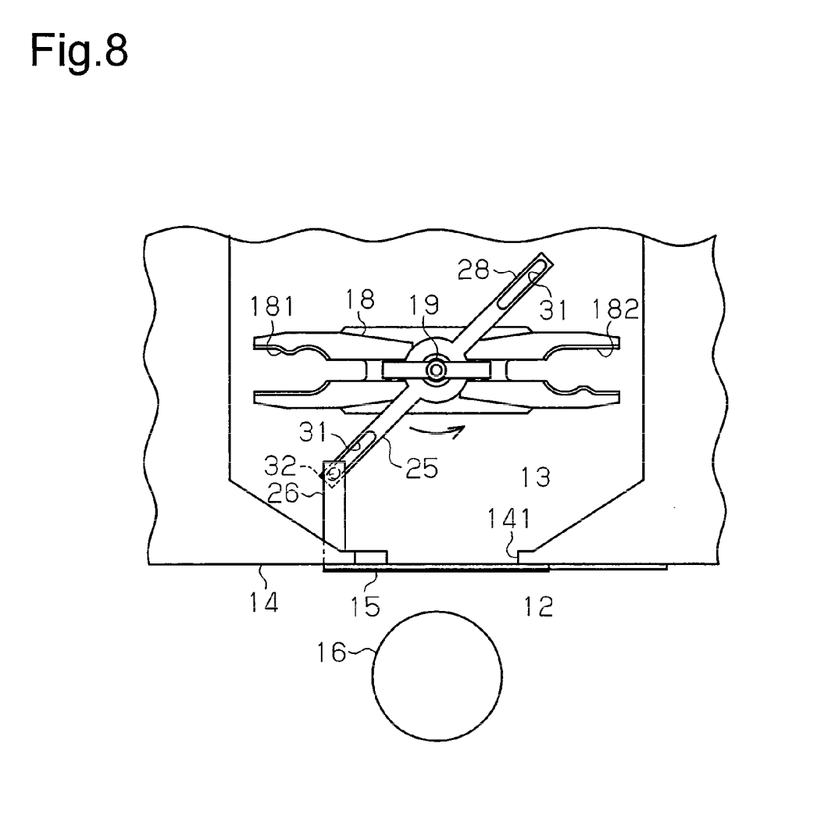
FIG. 8 is a partial plan view showing a modification.

As shown in FIG. 8, the provided position of a long hole and that of a pin relative to each other may be reversed for the receiving part 26 and the lever 28 respectively in the aforementioned embodiment. Specifically, long holes 31 may be formed at opposite ends of the lever 28 and a pin 32 may be formed on the lower surface of the receiving part 26. Even this structure can still make a fit between the pin 32 and the long hole 31. Thus, the door 15 is opened and closed with the lever 28 that rotates together with the tool exchanger arm 18. Further, in response to upward and downward movements of the tool exchanger arm 18, the pin 32 is fitted in the long hole 31 and the pin 32 is removed from the long hole 31. As a result, working effects comparable to those of the aforementioned embodiment can be achieved.

The structure of the tool magazine 20 may be such that the tool pots 21 are arranged linearly.

The structure of the machine tool may be such that the tool magazine 20 and the tool pots 21 rotate about a horizontal axis. In this case, it is preferable that, for opening and closing of the door 15, the door 15 moves along a horizontal plane.

The invention claimed is:

1. A machine tool comprising:
a processing room for processing a workpiece,
a tool room where a tool exchanger arm is placed,
a partition wall with which the processing room and the tool room are defined,
a door used for opening and closing an opening formed in the partition wall, and
an interlocking mechanism linking the door and the tool exchanger arm, the interlocking mechanism comprising:
a receiving part fixed to the door, and
a lever that moves with the tool exchanger arm,
wherein an elongated hole is provided to one of the receiving part and the lever, and a pin is provided to the other of the receiving part and the lever, wherein the pin is configured to be moved into and out of the hole via movement of the tool exchanger arm, and
wherein the interlocking mechanism works in an interlocking relationship with a tool exchanging operation by the tool exchanger arm to open and close the opening with the door when the pin is in the hole.

2. The machine tool according to claim 1, wherein:
the elongated hole is provided to the receiving part; and
the pin rotates together with the tool exchanger arm, the pin being fitted into and removed from the elongated hole in response to movement of the tool exchanger arm in an axis direction.

3. The machine tool according to claim 2, wherein the lever is fixed to a rotary shaft to which the tool exchanger arm is attached, and wherein the pin is provided to the lever.

4. The machine tool according to claim 1, wherein:
the pin is provided to the receiving part; and
the elongated hole is provided to the lever, and the lever rotates together with the tool exchanger arm, the elongated hole being fitted to and removed from the pin in response to movement of the tool exchanger arm in an axis direction.

5. A machine tool comprising:
a processing room having a main shaft,
a tool room having a tool exchanger arm and having a tool magazine,
a partition wall with which the processing room and the tool room are defined,
a door used for opening and closing an opening formed in the partition wall,
the tool exchanger arm rotating about an axis and moving in the direction of the axis to exchange a tool between the tool magazine and the main shaft,
the machine tool further comprising:
a receiving part fixed to the door;
a lever that rotates together with the tool exchanger arm, the lever moving in the axis direction;
an elongated hole provided to one of the receiving part and the lever; and
a pin provided to the other of the receiving part and the lever,
the pin being removably fitted in the elongated hole,
wherein the pin is removed from the elongated hole in response to movement of the tool exchanger arm in the axis direction, and
the door is opened and closed in response to rotation of the tool exchanger arm while the pin is fitted in the elongated hole.

6. The machine tool according to claim 5, wherein the axis about which the tool exchanger arm rotates extends vertically, and wherein the tool magazine rotates about an additional axis line extending vertically.

* * * * *